Figure 1:
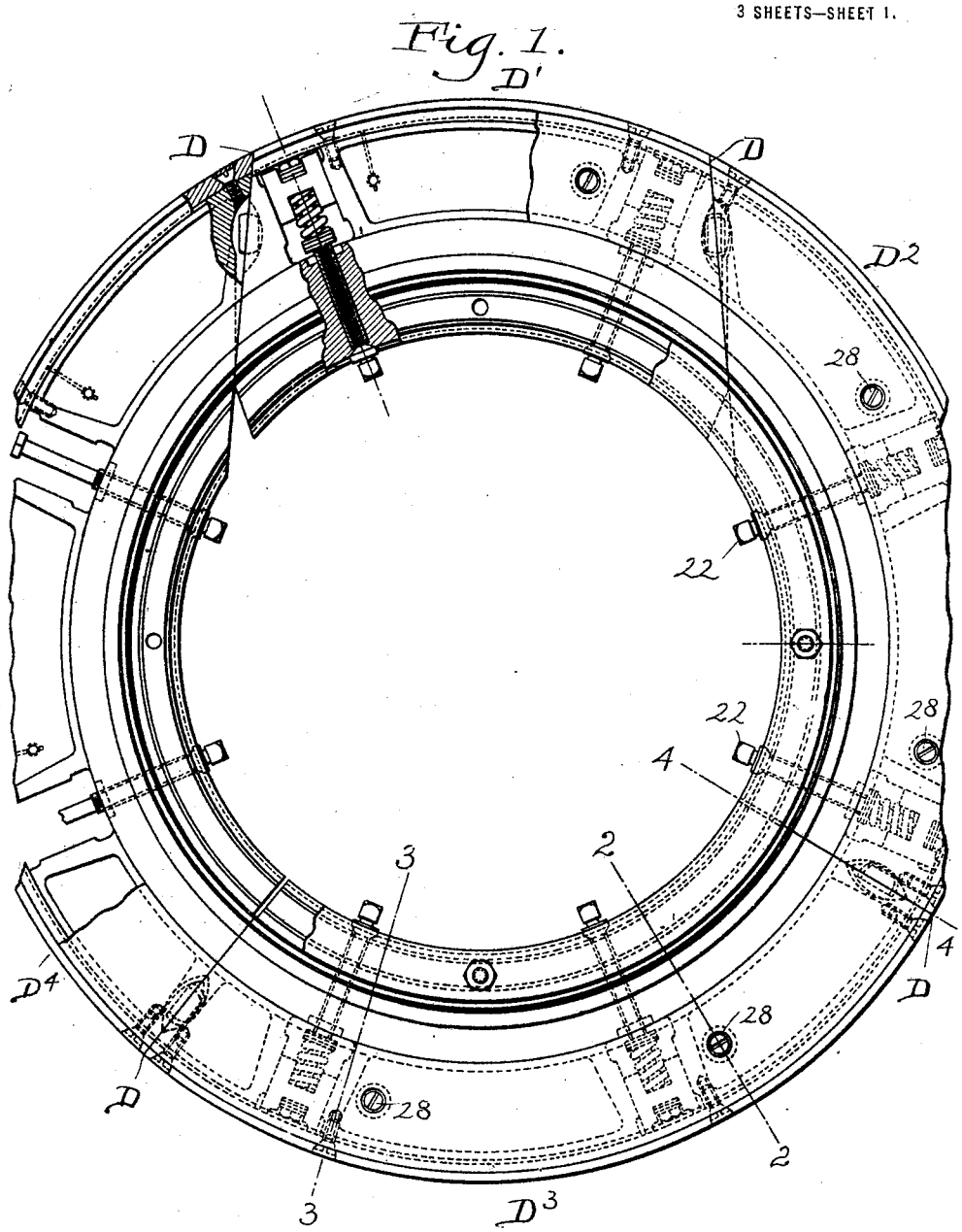

W. G. FORDING.
EXPANSIBLE COLLAPSIBLE TIRE FORMING CORE.
APPLICATION FILED JUNE 6, 1919.
1,373,228.
Patented Mar. 29, 1921.
3 SHEETS—SHEET 2.
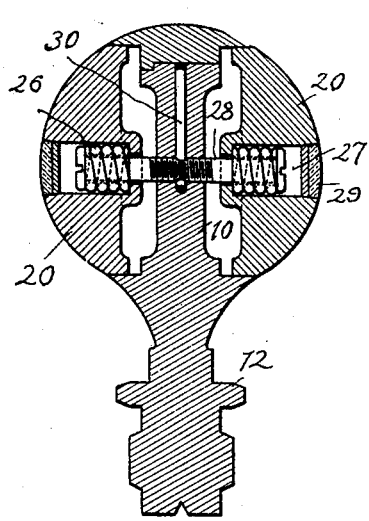
Fig. 2.
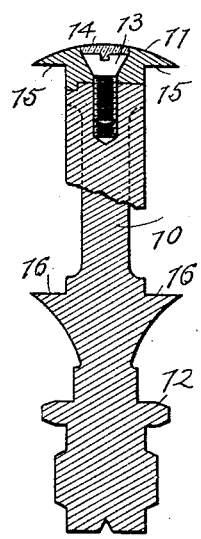
Fig. 3.
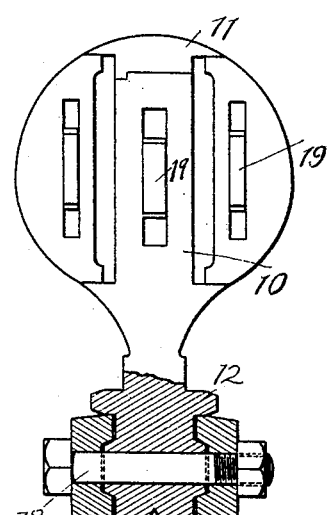
Fig. 4.
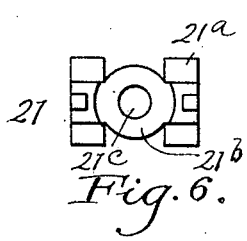
Fig. 6.
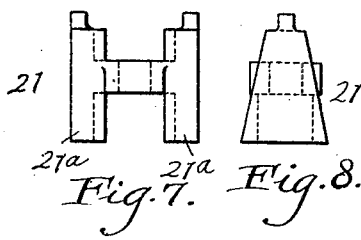
Fig. 7. Fig. 8.
Fig. 9
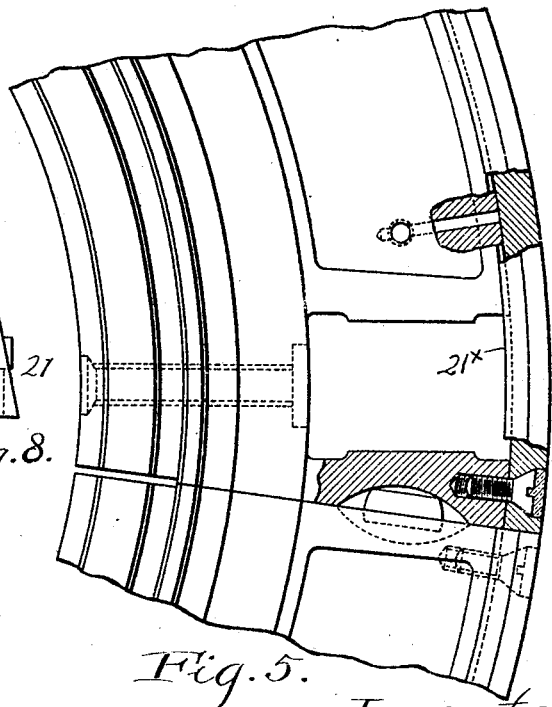
Fig. 5.
Inventor
William G. Fording
By
Thurston Kwis & Hudson
attys.

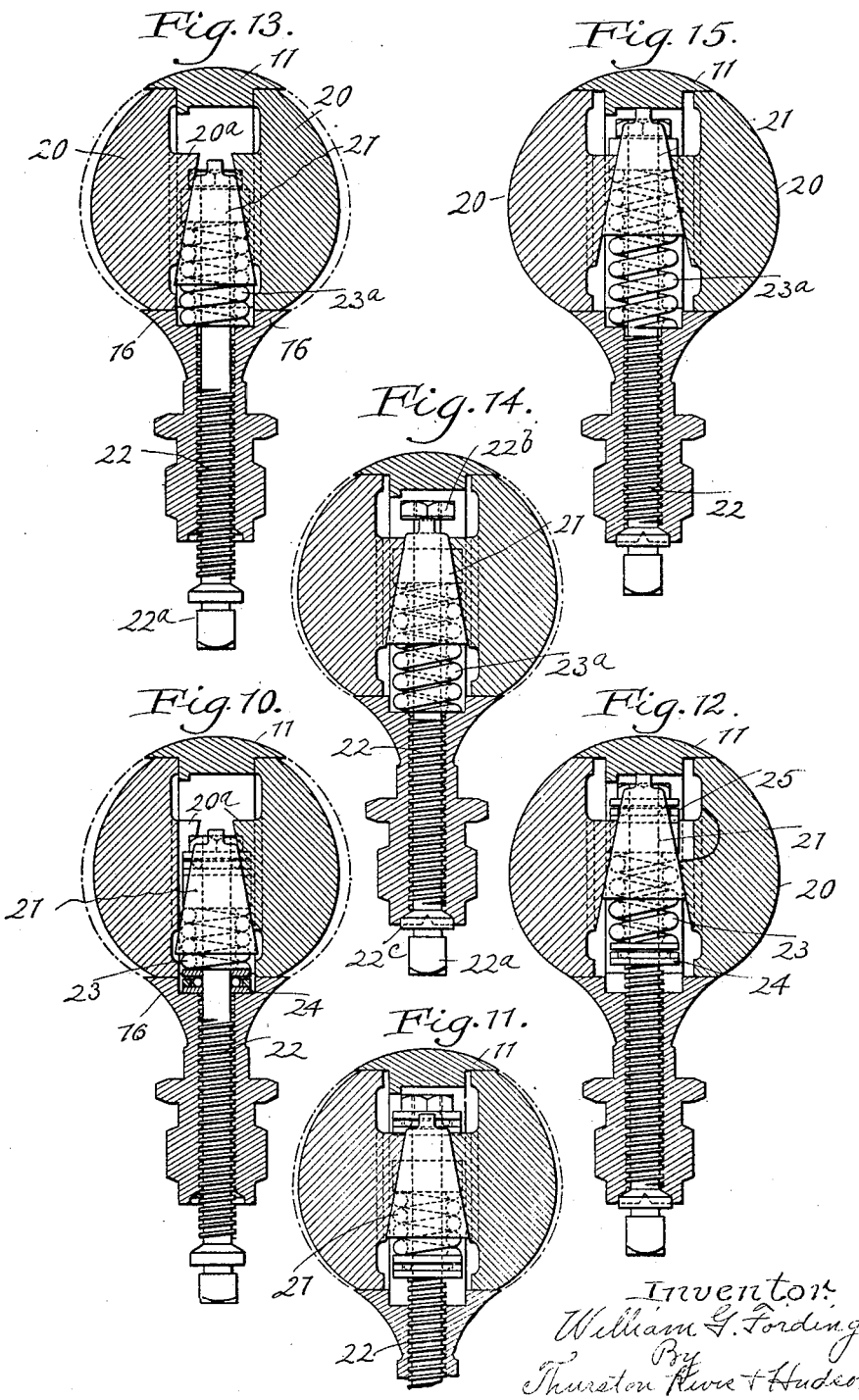

UNITED STATES PATENT OFFICE.

WILLIAM G. FORDING, OF CLEVELAND, OHIO.

EXPANSIBLE COLLAPSIBLE TIRE-FORMING CORE.

1,373,228.  Specification of Letters Patent.  Patented Mar. 29, 1921.

Application filed June 6, 1919. Serial No. 302,237.

*To all whom it may concern:*

Be it known that I, WILLIAM G. FORDING, a citizen of the United States, residing at Cleveland, in the county of Cuyahoga and State of Ohio, have invented a certain new and useful Improvement in Expansible Collapsible Tire-Forming Cores, of which the following is a full, clear and exact description.

This invention relates to collapsible and expansible cores for use in building and vulcanizing pneumatic tire shoes or casings. The principal object of the invention is to provide a core on which the casing may be built and vulcanized, with sections which can be expanded, and which eliminates buckling of the individual layers, forms a smooth interior on the tire casing, and which maintains the individual layers under the same tension.

Further the invention aims to provide a sectional, expansible core, so constructed that during vulcanization the core may expand automatically, thus maintaining the tension of the individual layers uniform.

In carrying out the present invention I have provided a core on which tire casings are designed to be built and vulcanized, and which has relatively movable or expansible sections and actuating devices therefor, of such a nature, and so arranged as to cause an automatic expansion when the casing is under treatment, so as to maintain the layers of the casing under a substantially uniform predetermined tension throughout the vulcanizing operation.

More specifically considered, the invention pertains to the type and construction of core constituting the subject matter of my prior application filed February 10, 1919, Serial No. 275,979, wherein I have disclosed a core divided transversely by planes which will permit the core to be collapsed, and composed of a ring with fixed tread and bead portions, and laterally expansible side portions, adapted to be expanded by radially movable wedges.

In its aspect just stated, the present invention comprises a core having the structural features just mentioned, and in addition, devices such as springs coöperating with the wedges, and so arranged and acting on the parts, preferably on the wedges themselves, that they will have an automatic spreading or expanding action on the expansible sections of the core.

The invention may be further briefly summarized as consisting in certain novel details of construction, and combinations and arrangements of parts which will be described in the specification and set forth in the appended claims.

Though the invention may be carried out in different ways, I have shown in the drawings, one embodiment and also a slight modification thereof, which operate effectively, and in the drawings Figure 1 is a side view of a core constructed in accordance with my invention, parts being broken away and in section; Figs. 2, 3 and 4 are sectional views substantially along the lines 2—2, 3—3, and 4—4 of Fig. 1, Figs. 2 and 4 showing the core fully expanded, and Fig. 3 omitting the expansible sections; Fig. 5 is an enlarged fragmentary side view of the fixed portion of the core, parts being in section; Figs. 6 to 9 are respectively a top plan, a side view, an edge view, and a bottom plan of one of the expanding wedges; Figs. 10, 11 and 12 are enlarged transverse sectional views of the core illustrated in Fig. 1, Fig. 10 showing the core in its contracted form or state, Fig. 11 showing it partially expanded, and Fig. 12 showing it wholly expanded; and Figs. 13, 14 and 15 are views corresponding to Figs. 10, 11 and 12, showing a slight modification in the wedge actuating means.

The core here shown, is divided by planes D, into four main sections, $D'$, $D^2$, $D^3$ and $D^4$, the division planes being so disposed that the core can be collapsed in the same manner that the ordinary solid core is rendered collapsible to permit the core to be removed from the casing after vulcanization. The planes D cut or divide both the fixed and movable portions of the core, and in fact, all the annular or circumferentially extending parts except the continuous clamping rings, to be referred to presently, which hold the parts in assembled relationship.

In the embodiment of my invention here shown, as in my prior application, the core includes a fixed ring having a central web 10, a tread portion 11, and bead portions 12, on which the inner or body portions of the tire casing are adapted to rest. During the process of vulcanization these portions do not move, though they are, of course, divided by the division planes D. The tread portion 11 is preferably formed separate from the web 10, and is secured in place by screws 13, the heads of which are preferably covered by plugs 14, to provide a smooth exterior. The tread portion 11 projects laterally beyond the web, forming shoulders 15, and between these shoulders and the bead portions 12, are lateral shoulders 16, these shoulders 15 and 16 having concentric faces, which when the core is assembled, form continuous annular surfaces. These shoulders likewise form on opposite sides of the fixed ring, annular channels or grooves.

It may be mentioned at this point, that the core is held in assembled relationship by continuous clamping rings 17 which encircle the inner portion of the fixed ring just within the bead portions 12, and by transverse clamping bolts 18 which pass through the clamping rings and through the inner part of the fixed ring, as shown most clearly in Fig. 4. Likewise the adjoining ends of the parts composing the fixed ring, where they are divided by the planes D, are connected together by keys 19, each pair of adjoining ends having one a key, and the other a slot which accommodates the key. The movable or expansible sections to be next referred to, are likewise locked by similar keys 19. The slots in the ends of the fixed and expansible sections which receive the keys are so disposed with reference to the division planes D that these keys will not interfere with the collapsing of the core, as will be readily seen by reference to Fig. 1.

Arranged on opposite sides of the web 10 of the fixed ring, are laterally expansible sectional rings 20, there being in this instance one expansible ring on each side of the fixed ring, although as explained and shown in my prior application, instead of there being only one expansible ring on each side of the fixed ring, there may be a plurality of expansible rings. These expansible rings or sections 20 engage the faces of the outer or tread shoulders 15, and of the inner shoulders 16, substantially filling the lateral channels formed in the fixed ring by these shoulders.

It will be understood that in the construction shown, when the core is assembled there is an expansible ring or section 20 on each side of the fixed ring, though the movable or expansible rings 20 are like the fixed ring, divided by the division planes D, and it will be understood also that the parts composing each expansible ring 20 are like the parts composing the fixed ring, held together by the keys and slots at their adjoining ends, so that each multi-part ring will move as a unit, in or out.

Coming now to the parts which more immediately involve the present invention and constitute the improvement or addition provided over the construction of my prior application, it will be observed that the laterally expansible sections are adapted to be moved outward by means of radially movable wedges 21 which engage tapered lugs 20$^a$ provided on the inner faces of the expansible rings 20, these wedges being provided at intervals in regularly or uniformly spaced radial slots 21$^x$, formed in the fixed ring between the tread portion 11 and the shoulders 16. These wedges are in this instance, substantially H-shaped, as shown in side elevation in Fig. 7, and are provided on opposite sides with tapered portions 21$^a$, and joining the tapered portions with a transverse web 21$^b$ having an opening 21$^c$ for a wedge operating bolt or equivalent operating device.

For actuating the wedges, any suitable means projecting radially inward through the fixed ring of the core may be utilized, and in this instance I show screws 22, whose inner ends 22$^a$ are squared to receive a socket wrench or equivalent turning device. However, as explained in my prior application, other means such as endwise movable plungers could be utilized to move or control the radial movement of the wedges. The screws are not in this instance directly attached to the wedges, but they pass loosely through the openings 21$^c$ in the central or web portions 21$^b$ of the wedges, each screw being provided at its outer end with a head 22$^b$ constituting a stop or abutment for the corresponding wedge, as will be explained.

In my prior application the wedges are moved radially outward and inward directly by the radial adjusting screws or plungers, but in this instance, while the direct or positive movement is contemplated for the inward movement of the wedges, the latter are moved outward by springs or equivalent devices which are capable of producing an automatic adjustment as the material of the casing softens under treatment, or during vulcanizing. In this instance, coil springs are employed for this purpose, these springs surrounding the adjusting bolts 22, and being located between the webs of the wedges and the bases of the slots or sockets in the fixed ring which accommodate the wedges.

In the construction shown in Figs. 1, 10, 11 and 12, the coil springs 23 at their lower or inner ends bear against ball bearing abutments 24, surrounding the bolts, and each consisting of a pair of disks with intervening balls. Likewise there are similar ball bearing abutments 25 between the heads of the outer ends of the bolts and the webs or central portions of the wedges. It will be noted by reference to Fig. 10, that when the core is contracted and the radial bolts are in their normal inward position, the starting or beginning of the threads on these bolts is a short distance beneath the ball bearing abutment 24, in consequence of which, when the bolts are screwed outward they will move relative to the lower abutments 24, allowing a certain expansion of the springs, but when the threaded portions of the bolts engage the abutments 24, the latter are lifted, and further expansion of the springs is stopped for the remainder of the outward movement of the bolts due to the resistance to expansion caused by the casing on the core.

The core is used and operated in the following manner: When the tire casing is built on the core, the core will be contracted as shown in Fig. 10, and the inner layer of soft uncured rubber which is first placed on the core, will naturally have a somewhat irregular shape, due to the fact that at this time the surface of the core is somewhat irregular since the movable rings are in their innermost positions. When the casing has been built and is placed in a vulcanizing mold ready for vulcanization, the screws 22 or equivalent devices are simultaneously moved radially outward their full distance, or until the tapered portions 22ᶜ just beyond the wrench engaging portions 22ᵃ, engage tapered sockets at the inner periphery of the fixed ring. For about one-half this outward movement of the bolts the shanks of the bolts pass freely through the lower ball bearing abutments 24, at which time the springs are free to expand, forcing the wedges radially outward for a distance, and causing a certain lateral movement of the expansible rings 20, but when the threads on the bolts travel up to the ball bearing abutment 24, they lift the latter, and during the remainder of the outward movement of the bolts the springs are compressed substantially as they were originally, but during this latter movement, no further expansion of the core takes place since the springs are overpowered, so to speak, by the resistance to expansion by the tire casing upon the core. At this time the parts occupy substantially the positions shown in Fig. 11, the core now being expanded about one-half its full amount.

During vulcanization as the material is softened, the wedges are forced outward further by the springs, causing a further expansion of the core, and maintaining the tension on the layers of the casing or tire carcass uniform, that is to say, from the time the bolts are moved outward the wedges are under a spring pressure which tends to expand the core, and as the resistance to expansion decreases under the action of heat, the core compensates for this by expanding, and this maintains all the layers of the tire casing throughout the vulcanizing process under substantially the same tension. The expansion continues until the outer ends of the wedges engage the tread portion of the fixed ring, and when this occurs the parts are in the position shown in Fig. 12, with the entire outer surface of the core smooth and continuous, the outer surfaces of the movable sections then being continuous with the adjoining surfaces of the inner and outer fixed portions of the core, and the core then having the desired shape that the inside wall of the casing should have. During the expansion of the core from its contracted to its full expanded position, the inner layer of gum of the tire casing becomes uniformly distributed over the inner surface of the casing, leaving the latter smooth and free of shoulders and ridges.

By the provision of the tapered shoulders 22ᶜ and the tapered sockets which these shoulders engage and which they tightly fit when the screws reach their full outer position, steam is prevented from passing lengthwise of the screws to the interior of the core.

As explained in my prior case, the screws 22 are preferably moved outward and inward simultaneously and exactly the same amount, and this can be done in numerous ways, as by means of a machine, which does not constitute a part of the present invention, having a plurality of socket wrenches which will simultaneously engage the inner ends of the bolts, and when actuated, will turn them precisely the same amount and at the same time.

After vulcanization the screws will be moved inward, and this will positively move the wedges to their normal inward position shown in Fig. 10. When this takes place the expansible rings are moved laterally inward, causing the contracting of the core to normal position, this being preferably accomplished through the medium of springs 26 arranged in sockets 27, provided in the expansible rings 20 and surrounding the shanks of screws 28, which project laterally from the web 10 of the fixed ring, as shown in Fig. 2, the springs being arranged between the bases of the sockets 27 and the heads of the screws. These sockets 27 are closed by plugs 29 to provide a smooth exterior. These screws 28 may be held against turning by pins 30, extending radially inward through the outer portion of the fixed ring 10, as shown in Fig. 2.

These sets of springs for contracting the core will be arranged at intervals around the core, as will be seen by reference to Fig. 1, where I have omitted the plugs 29 for the sake of clearness. These springs are, of course, weaker than the expanding springs 23, and are compressed or overpowered by the latter when the core is being expanded.

The construction shown in Figs. 13, 14 and 15 is similar to that first described, except that the ball bearing abutments 24 and 25 are omitted, and the expanding springs, here designated 23ᵃ, at their lower ends bear directly against the inner ends of the wedge slots, and at their outer ends bear against the cross webs of the wedges. With this construction, as the bolts 22 are moved outwardly, the springs and wedges follow the bolts until the springs are overpowered by the resistance to expansion offered by the casing on the core, whereupon the wedges and springs are stopped, though the latter continue to exert an expanding action on the wedges. When the casing is under treatment and the material softens, the springs move the wedges outward still further to substantially the position shown in Fig. 15, causing the automatic expansion previously explained, which moves the expansible rings outward to their final positions.

When the bolts are moved inward, the wedges are positively moved inward to their full inward positions shown in Fig. 13, compressing the springs 23ª. When this is done, the expansible rings 20 are moved inward by the springs 26, shown in Fig. 2.

Both the constructions shown in Figs. 10, 11 and 12, and in Figs. 13, 14 and 15 are efficient and operate to produce the desired results in the way of automatic expansion when the tire casing is under treatment, the construction shown in the first group of figures having the advantage over that last described in that shorter expansion springs can be employed.

It will be obvious that the principle of my invention may be carried out in different ways, and I therefore do not wish to be confined to the particular constructions or embodiments of the invention here shown, but aim in my claims to cover all modifications which do not involve a departure from the spirit and scope of my invention in its broadest aspects.

Having described my invention, I claim:

1. A sectional, expansible core for use in building and vulcanizing tire casings having means for automatically expanding the core when the tire casing on the core is under vulcanizing treatment, said core including separate relatively movable pieces or sections.

2. A collapsible, expansible annular core for use in building and vulcanizing tires having relatively movable portions, and means acting thereon for automatically expanding the core when the tire casing on the core is undergoing vulcanizing treatment.

3. An expansible, collapsible annular core for use in building and vulcanizing tires comprising fixed portions and movable portions, and means for exerting an expansive force on the movable portions to cause an automatic expansion of the core when the tire casing on the core is undergoing vulcanizing treatment.

4. An expansible core for use in building and vulcanizing tire casings having a fixed tread portion and laterally movable side portions, and means for moving said side portions so as to expand the core automatically when the tire casing on the core is undergoing vulcanizing treatment.

5. In an expansible core for use in building and vulcanizing tire casings, a fixed inner or bead portion and laterally movable side portions, and means for automatically moving the side portion so as to cause an expansion of the core when the tire casing on the core is undergoing vulcanizing treatment.

6. An expansible core for use in building and vulcanizing tire casings, having fixed tread and bead portions and laterally movable side portions, and means for exerting an expansive action on the side portions so as to cause an automatic expansion of the core when the tire casing on the core is undergoing vulcanizing treatment.

7. An expansible core for use in building and vulcanizing tire casings divided into transverse sections whereby the core may be collapsed, and divided circumferentially into sections, and means for exerting an expansive action on certain of the circumferential sections to cause an automatic expansion of the core when the tire casing is undergoing vulcanizing treatment.

8. In a core for use in building and vulcanizing tire casings, an annular member transversely divided to form sections to permit the core to be collapsed, and comprising a normally fixed ring having tread and bead portions and laterally movable rings, and means adapted to exert an expansive action on said laterally movable rings to cause an automatic expansion of the core when the tire casing thereon is undergoing vulcanizing treatment.

9. In a core for use in building and vulcanizing tire casings, a plurality of expansible members, and yieldable devices for exerting pressure thereon to cause an expansion of the core when the tire casing on the core is undergoing vulcanizing treatment.

10. In an expansible core for use in building and vulcanizing tire casings, a plurality of movable sections, and springs arranged to exert expansive pressure on said sections so as to cause an automatic expansion of the core when the tire casing thereon is undergoing vulcanizing treatment.

11. In a core for use in building and vulcanizing tire casings, a plurality of movable sections adapted to be moved to cause an expansion of the core, tapered means acting on said sections to shift them, and yieldable means acting on said tapered means.

12. In a core for use in building and vulcanizing tire casings, a plurality of movable members, wedges for moving said members to expand the core, and springs acting on the wedges to shift the same.

13. In a core for use in building and vulcanizing tire casings, a plurality of movable members, wedges for moving said members to expand the core, springs acting on the wedges to shift the same, and means for compressing the springs to permit the core to be contracted.

14. In a core for use in building and vulcanizing tire casings, a plurality of movable members, wedges for moving said members to expand the core, springs adapted to act on the wedges to shift the same, and means for releasing the springs so that they may exert expansive action on the wedges.

15. A core for use in building and vulcanizing tire casings comprising a fixed portion and laterally movable portions, wedges for spreading said movable portions to expand the core, and springs acting on the wedges to shift them.

16. A core for use in building and vulcanizing tire casings comprising a fixed ring, laterally movable rings for expanding the core, wedges mounted in the fixed ring, devices extending radially inward through the fixed ring for controlling the wedges, and yieldable means carried by the fixed ring and acting on the wedges to move the same outwardly.

In testimony whereof, I hereunto affix my signature.

WILLIAM G. FORDING.